United States Patent
Zhao

(10) Patent No.: US 9,860,335 B2
(45) Date of Patent: Jan. 2, 2018

(54) METHOD, DEVICE AND SYSTEM FOR DELIVERING LIVE CONTENT

(71) Applicant: Huawei Technologies Co. Ltd., Shenzhen, Guangdong (CN)

(72) Inventor: Zhihong Zhao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 453 days.

(21) Appl. No.: 14/135,093

(22) Filed: Dec. 19, 2013

(65) Prior Publication Data

US 2014/0108586 A1    Apr. 17, 2014

Related U.S. Application Data

(63) Continuation of application No. PCT/CN2011/083162, filed on Nov. 29, 2011.

(51) Int. Cl.
*H04L 29/08* (2006.01)
*H04N 21/231* (2011.01)
(Continued)

(52) U.S. Cl.
CPC ........ *H04L 67/2847* (2013.01); *H04L 65/605* (2013.01); *H04N 21/218* (2013.01);
(Continued)

(58) Field of Classification Search
CPC ... H04L 65/4084; H04L 65/605; H04L 65/80; H04L 67/28; H04L 67/2842;
(Continued)

(56) References Cited

U.S. PATENT DOCUMENTS

| | | | | |
|---|---|---|---|---|
| 8,560,629 | B1* | 10/2013 | Bhatti | H04L 67/2847 348/466 |
| 2008/0228939 | A1* | 9/2008 | Samuels | H04L 67/28 709/235 |
| 2011/0131341 | A1* | 6/2011 | Yoo | G06F 17/30902 709/237 |
| 2012/0254456 | A1* | 10/2012 | Visharam | H04N 21/2343 709/231 |

(Continued)

FOREIGN PATENT DOCUMENTS

| CN | 101090367 A | 12/2007 |
|---|---|---|
| CN | 101540885 A | 9/2009 |

(Continued)

OTHER PUBLICATIONS

"MPEG-2," Wikipedia, the free encyclopedia, http://en.wikipedia.org/wiki/MPEG-2, accessed Jul. 30, 2014 (Last modified Jul. 24, 2014).

(Continued)

*Primary Examiner* — Arvin Eskandarnia
*Assistant Examiner* — Gil H. Lee
(74) *Attorney, Agent, or Firm* — Leydig, Voit & Mayer, Ltd.

(57) ABSTRACT

The present invention provides a method, a device, and a system for delivering live content. A pre-delivery request with respect to live content is sent to a CDN cache device, and the CDN cache device caches the live content according to the pre-delivery request with respect to the live content before a user views the live content, thereby solving the problems of a long delay and poor user experience in playing live content that is not cached because a part of live content cannot be cached in the prior art, ensuring the play quality of all live content, and improving user experience.

10 Claims, 6 Drawing Sheets

(51) Int. Cl.
*H04N 21/647* (2011.01)
*H04N 21/218* (2011.01)
*H04N 21/222* (2011.01)
*H04N 21/643* (2011.01)
*H04N 21/845* (2011.01)
*H04L 29/06* (2006.01)

(52) U.S. Cl.
CPC ..... *H04N 21/222* (2013.01); *H04N 21/23106* (2013.01); *H04N 21/64322* (2013.01); *H04N 21/64761* (2013.01); *H04N 21/8456* (2013.01); *H04L 65/4084* (2013.01); *H04L 65/80* (2013.01); *H04L 67/28* (2013.01); *H04L 67/2842* (2013.01)

(58) Field of Classification Search
CPC .............. H04L 67/2847; H04N 21/218; H04N 21/222; H04N 21/23106; H04N 21/64322; H04N 21/64761; H04N 21/8456
See application file for complete search history.

(56) References Cited

U.S. PATENT DOCUMENTS

2013/0166625 A1* 6/2013 Swaminathan .. H04N 21/64738
709/203

FOREIGN PATENT DOCUMENTS

| | | |
|---|---|---|
| CN | 101552800 A | 10/2009 |
| CN | 102244644 A | 11/2011 |
| KR | 100872227 B1 | 12/2008 |

OTHER PUBLICATIONS

Fielding et al., "Hypertext Transfer Protocol—HTTP/1.1," Network Working Group, Request for Comments 2616, pp. 176 (Jun. 1999).
"Series H: Audiovisual and Multimedia Systems; Infrastructure of audiovisual services—Coding of moving video; Advanced video coding for generic audiovisual services," Telecommunication Standardization Sector of ITU, H.264, International Telecommunication Union, Geneva, Switzerland (Mar. 2009).

* cited by examiner

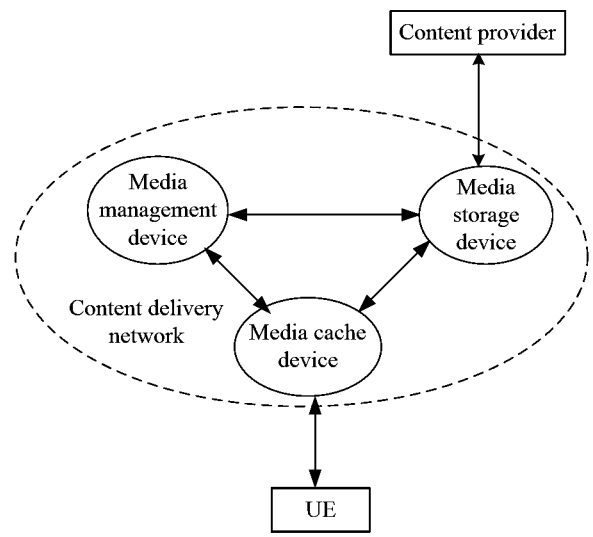

FIG. 1

A content delivery network cache device receives a pre-delivery request sent by a content delivery network management device with respect to live content, where the pre-delivery request is sent to the content delivery network cache device by the content delivery network management device before the live content is requested to be played — 200

The content delivery network cache device obtains a fragment file of the live content according to the pre-delivery request — 202

FIG. 2

METHOD, DEVICE AND SYSTEM FOR DELIVERING LIVE CONTENT

CROSS-REFERENCE TO RELATED APPLICATIONS

This application is a continuation of International Patent Application No. PCT/CN2011/083162, filed on Nov. 29, 2011, which is hereby incorporated by reference in its entirety.

TECHNICAL FIELD

The present invention relates to the field of multimedia information technologies, and in particular, to a method, a device, and a system for delivering live content.

BACKGROUND

A content delivery network (CDN), by delivering content to edges of the network, implements content services for users nearby in a distributed manner. In the CDN, a content cache server is deployed on each network node, and a CDN center control system directs a request of a user to an optimal serving node in real time according to information such as network traffic, connections between nodes, load conditions, and distances from the user; for the user, by using the CDN system, the response time for a service request is shortened, stability of data transmission is improved, and thereby quality of service of the network is improved.

At present, delivery of live content is implemented by using the CDN, and an algorithm model of the CDN is as follows: caching live content according to on-demand popularity of live content, where live content of high popularity is delivered to an edge node cache device for caching, while live content of low popularity always cannot be cached, resulting in a long delay and poor user experience in playing live content that is not cached.

SUMMARY

Embodiments of the present invention provide a method, a device, and a system for delivering live content, which are used for ensuring the play quality of all live content, and avoiding a long delay and poor user experience in playing a part of live content.

An embodiment of the present invention provides a method for delivering live content, including: receiving, by a content delivery network cache device, a pre-delivery request sent by a content delivery network management device with respect to live content, where the pre-delivery request is sent to the content delivery network cache device by the content delivery network management device before the live content is requested to be played; and obtaining, by the content delivery network cache device, a fragment file of the live content according to the pre-delivery request.

An embodiment of the present invention further provides a method for delivering live content, including: obtaining, by a content delivery network management device, information about live content injected in a content origin server; and sending, by the content delivery network management device, a pre-delivery request with respect to the live content to a content delivery network cache device, so that the content delivery network cache device obtains a fragment file of the live content according to the pre-delivery request before the live content is requested to be played.

An embodiment of the present invention further provides a content delivery network cache device, including: a receiving module, configured to receive a pre-delivery request sent by a content delivery network management device with respect to live content, where the pre-delivery request is sent to the content delivery network cache device by the content delivery network management device before the live content is requested to be played; and a content obtaining module, configured to obtain a fragment file of the live content according to the pre-delivery request.

An embodiment of the present invention further provides a content delivery network management device, including: an information obtaining module, configured to obtain information about live content injected in a content origin server; and a sending module, configured to send a pre-delivery request with respect to the live content to a content delivery network cache device, so that the content delivery network cache device obtains a fragment file of the live content according to the pre-delivery request before the live content is requested to be played.

An embodiment of the present invention further provides a system for delivering live content, including: a content delivery network management device and a content delivery network cache device, where: the content delivery network management device is configured to obtain information about live content injected in a content origin server, and send a pre-delivery request with respect to the live content to the content delivery network cache device; and the content delivery network cache device is configured to receive the pre-delivery request sent by the content delivery network management device with respect to the live content, and obtain a fragment file of the live content according to the pre-delivery request, where the pre-delivery request is sent to the content delivery network cache device by the content delivery network management device before the live content is requested to be played.

In the embodiments of the present invention, a pre-delivery request with respect to live content is sent to a CDN cache device, and the CDN cache device caches the live content according to the pre-delivery request with respect to the live content before a user views the live content, thereby solving the problems of a long delay and poor user experience in playing live content that is not cached because a part of live content cannot be cached in the prior art, ensuring the play quality of all live content, and improving user experience.

BRIEF DESCRIPTION OF DRAWINGS

FIG. 1 is a schematic structural diagram of a CDN in the prior art;

FIG. 2 is a schematic flowchart of an embodiment of a method for delivering live content according to an embodiment of the present invention;

DESCRIPTION OF EMBODIMENTS

Figure 3:
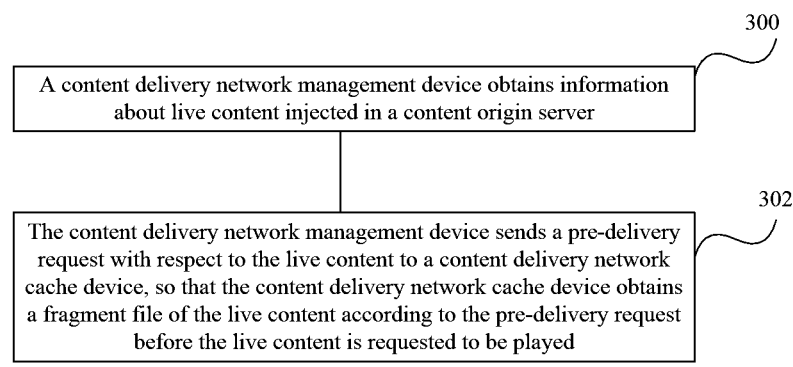
FIG. 3 is a schematic flowchart of another embodiment of a method for delivering live content according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

First the structure of a CDN in the prior art is described before a method, a device, and a system for delivering live content according to the embodiments of the present invention are described. FIG. 1 is a schematic structural diagram of a CDN in the prior art. As shown in FIG. 1, the CDN is formed by three devices, which are a media management device, a media storage device, and a media cache device respectively. The media management device is configured to implement a content delivery function; the media storage device is configured to store content injected by a content provider; and the media cache device is configured to cache delivered content, and is usually arranged at a location near a terminal device and provides services for a user nearby.

The following describes the overall technical solution of a method embodiment of the present invention.

Method Embodiment 1

FIG. 2 is a schematic flowchart of an embodiment of a method for delivering live content according to an embodiment of the present invention. As shown in FIG. 2, the method in the embodiment of the present invention includes:

Step 200: A content delivery network cache device receives a pre-delivery request sent by a content delivery network management device with respect to live content, where the pre-delivery request is sent to the content delivery network cache device by the content delivery network management device before the live content is requested to be played.

In the embodiment of the present invention, the CDN cache device receives a pre-delivery request sent by the CDN management device with respect to live content; before the CDN cache device receives the pre-delivery request sent by the CDN management device with respect to live content, the CDN management device needs to obtain information about live content injected in a content origin server, where the content origin server may be a part of the CDN and is provided by a CDN provider, or may also be provided by a content provider (CP) or a service provider (SP).

Program content in the content origin server may include live content and on-demand content, where the live content is injected through a live source and the on-demand content is injected through an on-demand source, and the live source and on-demand source may be provided by the CP or SP.

In the embodiment of the present invention, the CDN management device may obtain, in a manual mode or an automatic mode, information about live content injected in the content origin server.

The manual mode may be that a CDN administrator inputs the information about the live content injected in the content origin server into the CDN management device. Specifically, when the CP or SP injects the live content in the content origin server, the administrator of the CP or SP notifies the CDN administrator that the injected content is live content, and the CDN administrator sets the injected content as live content in the CDN management device.

For example, the CDN is leased temporarily to play a live program; the temporary leaser may notify the live content injected in the content origin server to the CDN administrator, and the CDN administrator sets the injected content as live content in the CDN management device.

The automatic mode may be that after the content origin server identifies the injected content as live content, the content origin server actively sends information about the live content to the CDN management device, or may also be that after the content origin server identifies the injected content as live content, the CDN management device actively obtains information about live content, for example, the CDN management device may query the content origin server every 2 seconds.

Step 202: The content delivery network cache device obtains a fragment file of the live content according to the pre-delivery request.

In the embodiment of the present invention, the pre-delivery request carries information about live content, where the information may be an index file address of the fragment file of the live content, for example, a URL (Uniform Resource Locator) of an index file of the fragment file of the live content.

In the embodiment of the present invention, the CDN cache device may obtain the fragment file of the live content according to the URL of the index file of the fragment file of the live content, which specifically includes the following steps:

The CDN cache device accesses the content origin server according to the URL of the index file of the fragment file of the live content, and obtains the index file of the fragment file of the live content from the content origin server; the CDN cache device parses the index file to obtain the URL of the fragment file of the live content carried in the index file; the CDN cache device accesses the content origin server according to the URL of the fragment file of the live content, and obtains the fragment file of the live content from the content origin server.

In the embodiment of the present invention, a CDN cache device caches live content according to a pre-delivery request sent by a CDN management device with respect to the live content before a user views the live content, thereby solving the problems of a long delay and poor user experience in playing live content that is not cached because a part of live content cannot be cached in the prior art, ensuring the play quality of all live content, and improving user experience.

The embodiment of the present invention may further include: after the CDN cache device obtains the fragment file of the live content, storing, by the CDN cache device, the obtained fragment file of the live content into a memory of the CDN cache device. Because the fragment file of the live content is stored into the memory of the CDN cache device, frequent reading and writing operations on a magnetic disk are not required, so that the service life of the magnetic disk is not shortened; meanwhile, when the CDN cache device receives a live content service request sent by a terminal device, the CDN cache device directly provides the fragment file of the live content in the memory for the terminal device without accessing the magnetic disk, thereby avoiding being limited by the number of reading and writing operations on the magnetic disk per second, and supporting more concurrent requests.

It should be noted that after the CDN cache device stores the fragment file of the live content into the memory of the CDN cache device, the method may further include: obtaining, by the CDN cache device, a new fragment file of the live content, and using the new fragment file to update the fragment file of the live content stored in the memory. Because the fragment file of the live content stored in the memory is updated, usage of the memory of the CDN cache device is improved while quality of service of the live content is ensured.

Method Embodiment 2

FIG. 3 is a schematic flowchart of another embodiment of a method for delivering live content according to an embodiment of the present invention. As shown in FIG. 3, the method in the embodiment of the present invention includes:

Step 300: A content delivery network management device obtains information about live content injected in a content origin server.

In the embodiment of the present invention, the mode of obtaining, by the CDN management device, information about live content injected in a content origin server may include multiple modes, for example, a manual mode or an automatic mode.

The manual mode may be that a CDN administrator inputs the information about the live content injected in the content origin server into the CDN management device. For the specific implementation, reference may be made to the description in Method Embodiment 1.

The automatic mode may be that after the content origin server identifies the injected content as live content, the content origin server actively sends information about the live content to the CDN management device, or may also be that after the content origin server identifies the injected content as live content, the CDN management device actively obtains information about live content, for example, the CDN management device may query the content origin server every 1 second.

Step 302: The content delivery network management device sends a pre-delivery request with respect to the live content to a content delivery network cache device, so that the content delivery network cache device obtains a fragment file of the live content according to the pre-delivery request before the live content is requested to be played.

In the embodiment of the present invention, the pre-delivery request carries information about the live content, where the information may be an index file address of the fragment file of the live content, for example, a URL (Uniform Resource Locator) of an index file of the fragment file of the live content; the specific mode of obtaining the fragment file of the live content by the CDN cache device according to the URL of the index file is described in Method Embodiment 1, and is not further described in the embodiment of the present invention.

In the embodiment of the present invention, a CDN management device obtains information about live content injected in a content origin server, and sends a pre-delivery request with respect to the live content to a CDN cache device, so that the CDN cache device caches the live content according to the pre-delivery request before a user requests to play the live content, thereby solving the problems of a long delay and poor user experience in playing live content that is not cached because a part of live content cannot be cached in the prior art, ensuring the play quality of all live content, and improving user experience.

The embodiment of the present invention may further include: after the CDN cache device obtains the fragment file of the live content, storing, by the CDN cache device, the fragment file of the live content into a memory of the CDN cache device. Because the fragment file of the live content is stored into the memory of the CDN cache device, frequent reading and writing operations on a magnetic disk are not required, so that the service life of the magnetic disk is not shortened; meanwhile, when the CDN cache device receives a live content service request sent by a terminal device, the CDN cache device directly provides the fragment file of the live content in the memory for the terminal device without accessing the magnetic disk, thereby avoiding being limited by the number of reading and writing operations per second on the magnetic disk, and providing more concurrent requests.

It should be noted that after the CDN cache device stores the fragment file of the live content into the memory of the CDN cache device, the method may further include: obtaining, by the CDN cache device, a new fragment file of the live content, and using the new fragment file to update the fragment file of the live content stored in the memory. Because the fragment file of the live content stored in the memory is updated, usage of the memory of the CDN cache device is improved while quality of service of the live content is ensured.

The technical solution provided by the above embodiment of the present invention may be applied to CDNs of different architectures. In the following description, a CDN in a two-level networking mode and a CDN in a three-level networking mode are respectively used as examples.

Method Embodiment 3

Figure 4:
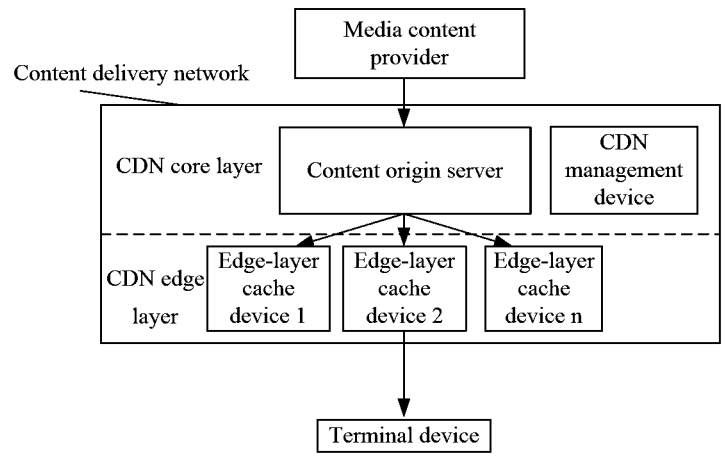
FIG. 4 shows a CDN in a two-level networking mode.

FIG. 4 shows a CDN in a two-level networking mode. As shown in FIG. 4, the CDN includes a CDN core layer and a CDN edge layer.

The CDN core layer includes a content origin server and a CDN management device. The CDN core layer is responsible for injecting and storing and delivering media content. The content origin server is usually a streaming server or a server cluster formed by multiple streaming servers, and is configured to store multimedia information, and may implement operations such as encoding, packaging, request scheduling, and transmission of multimedia content. The CDN management device is responsible for management of the whole CDN system, and especially content management, for example, injection and delivery of content, real-time delivery of content, and auditing of content and provisioning of content services.

The CDN edge layer provides a media service for a user. In the embodiment of the present invention, the cache server located at the CDN edge layer is called a CDN edge-layer cache server, and the CDN edge-layer server may be an edge streaming server; the CDN edge-layer cache server is configured to cache streaming content, and provides services for a terminal device nearby.

Figure 5:
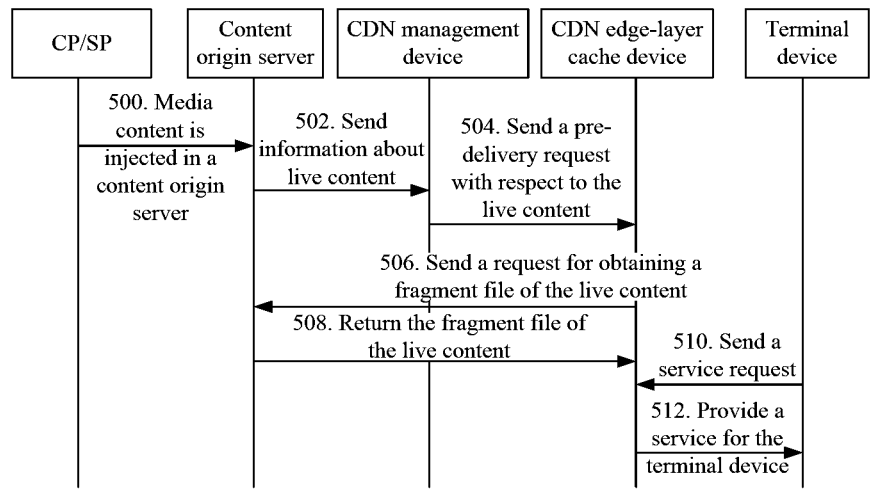
FIG. 5 is a schematic flowchart of another embodiment of a method for delivering live content according to an embodiment of the present invention.

FIG. 5 is a schematic flowchart of another embodiment of a method for delivering live content according to an embodiment of the present invention. As shown in FIG. 5, the method in the embodiment of the present invention includes the following steps:

Step 500: Media content is injected in a content origin server.

In the embodiment, the media content injected in the content origin server includes live content and on-demand content; for the live content, before it is injected in the content origin server, a CP or an SP needs to collect and encode audio and video data in real time, and perform stream fragmentation for the encoded real-time audio and video data.

In the following description, it is assumed that a real-time stream based on a Hypertext Transfer Protocol (HTTP) is injected in a content origin server.

Real-time audio and video data is collected. A tool for collecting the real-time audio and video data may be a camera, a microphone, a mixer, and so on. The tool for collecting the real-time audio and video data collects and sends the real-time audio and video data to an encoder; the encoder compresses and encodes the received audio and video data into an elementary stream compliant with H.264 video format and AAC audio format, and encapsulates the elementary stream of the audio and video into a file compliant with MPGE2 format.

A stream fragmenter performs stream fragmentation for the collected and encoded audio and video data, fragments the collected and encoded audio and video data into multiple media files (hereinafter referred to as TS files) of a TS (Transport Stream) format, and meanwhile generates an m3u8 index file including a pointer pointing to the TS files.

For example, the stream fragmenter fragments the collected and encoded audio and video data every 10 seconds, and meanwhile generates an m3u8 index file including a pointer pointing to a TS file; a TS file is generated at an interval of 10 seconds, and the m3u8 index file also correspondingly refreshes the description of the newly generated TS file.

The TS file and m3u8 index file are injected in the content origin server; in the content origin server, the suffix of the index file is m3u8. The index file uses an extended M3U play list format, and the suffix of the TS file is ts.

Step 502: The content origin server sends information about live content to a CDN management device.

Step 504: The CDN management device sends a pre-delivery request with respect to the live content to a CDN edge-layer cache device.

Step 506: The CDN edge-layer cache device sends a request for obtaining a fragment file of the live content to the content origin server.

Step 508: The content origin server returns the fragment file of the live content to the CDN edge-layer cache device.

Step 510: The CDN edge-layer cache device receives a live content service request sent by a terminal device.

Step 512: The CDN edge-layer cache device provides a service for the terminal device.

Specifically, the CDN edge-layer cache device receives a service request sent by the terminal device, and after parsing the request, sends the fragment file of the live content to the terminal device for playing.

In the embodiment of the present invention, when media content is injected in a content origin server, the content origin server sends information about live content injected in the media content to a CDN management device; the CDN management device sends a pre-delivery request with respect to the live content to a CDN edge-layer cache device, so that the CDN edge-layer cache device caches the live content according to the pre-delivery request before a user requests to play the live content, thereby solving the problems of a long delay and poor user experience in playing live content that is not cached because a part of live content cannot be cached in the prior art, ensuring the play quality of all live content, and improving user experience.

The embodiment of the present invention may further include: after the CDN edge-layer cache device obtains the fragment file of the live content, storing, by the CDN edge-layer cache device, the fragment file of the live content into a memory of the CDN edge-layer cache device. Because the fragment file of the live content is stored into the memory of the CDN edge-layer cache device, frequent reading and writing operations on a magnetic disk are not required, so that the service life of the magnetic disk is not shortened; meanwhile, when the CDN cache device receives a live content service request sent by a terminal device, the CDN cache device directly provides the fragment file of the live content in the memory for the terminal device without accessing the magnetic disk, thereby avoiding being limited by the number of reading and writing operations per second on the magnetic disk, and providing more concurrent requests.

It should be noted that after the CDN edge-layer cache device stores the fragment file of the live content into the memory of the CDN edge-layer cache device, the method may further include: obtaining, by the CDN edge-layer cache device, a new fragment file of the live content, and using the new fragment file to update the fragment file of the live content stored in the memory. Because the fragment file of the live content stored in the memory is updated, usage of the memory of the CDN edge-layer cache device is improved while quality of service of the live content is ensured.

Method Embodiment 4

Figure 6:
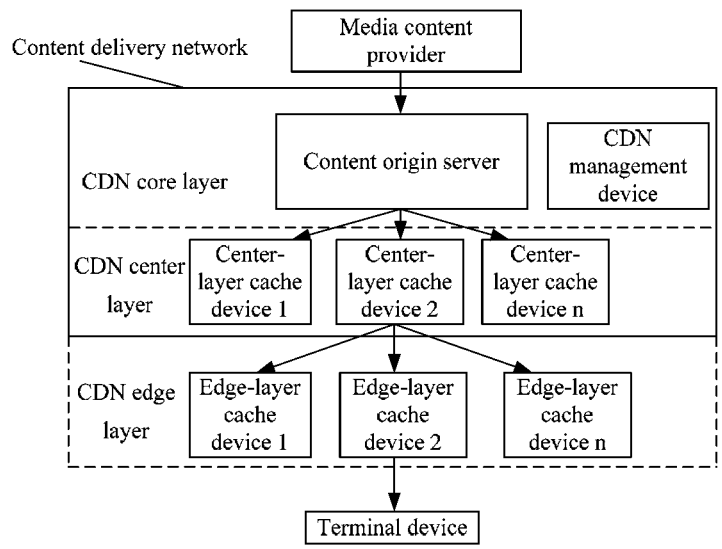
FIG. 6 shows a CDN in a three-level networking mode.

A CDN in a three-level networking mode may be constructed on the basis of the CDN in a two-level networking mode in order to increase CDN extensibility. As shown in FIG. 6, on the basis of FIG. 4, a center layer is added to the CDN; and a high-capacity cache server is deployed at the CDN center layer. In the embodiment of the present invention, the high-capacity cache server deployed at the CDN center layer is called a CDN center-layer cache server.

Figure 7:
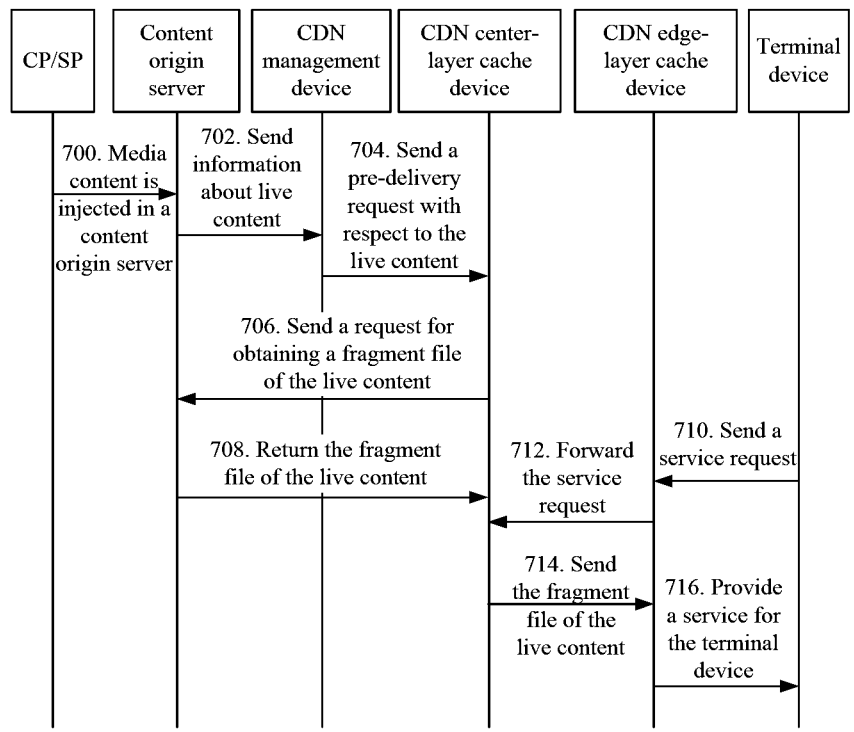
FIG. 7 is a schematic flowchart of another embodiment of a method for delivering live content according to an embodiment of the present invention.

FIG. 7 is a schematic flowchart of another embodiment of a method for delivering live content according to an embodiment of the present invention. As shown in FIG. 7, the method includes the following steps:

Step 700: Media content is injected in a content origin server.

The mode of injecting media content in a content origin server is described in Method Embodiment 3, and is not further described in the embodiment of the present invention.

Step 702: The content origin server sends information about live content to a CDN management device.

Step 704: The CDN management device sends a pre-delivery request with respect to the live content to a CDN center-layer cache device.

Step 706: The CDN center-layer cache device sends a request for obtaining a fragment file of the live content to the content origin server.

Step 708: The content origin server returns the fragment file of the live content to the CDN center-layer cache device.

It should be noted that during the specific implementation, the CDN center-layer cache device may also provide a service for a terminal device directly.

Step 710: A CDN edge-layer cache device receives a live content service request sent by a terminal device.

Step 712: The CDN edge-layer cache device forwards the service request to the CDN center-layer cache device.

Step 714: The CDN center-layer cache device sends the fragment file of the live content requested by the service request to the CDN edge-layer cache device.

Step 716: The CDN edge-layer cache device provides a service for the terminal device.

In the embodiment of the present invention, when media content is injected in a content origin server, the content origin server sends information about live content injected in the media content to a CDN management device; the CDN management device sends a pre-delivery request with respect to the live content to a CDN center-layer cache device, so that the CDN center-layer cache device caches the live content according to the pre-delivery request before a user requests to play the live content, thereby solving the problems of a long delay and poor user experience in playing live content that is not cached because a part of live content cannot be cached in the prior art, ensuring the play quality of all live content, and improving user experience.

The embodiment of the present invention may further include: after the CDN center-layer cache device obtains the fragment file of the live content, storing, by the CDN center-layer cache device, the fragment file of the live content into a memory of the CDN center-layer cache device. Because the fragment file of the live content is stored into the memory of the CDN center-layer cache device, frequent reading and writing operations on a magnetic disk are not required, so that the service life of the magnetic disk is not shortened; meanwhile, when the CDN center-layer cache device receives a live content service request sent by the CDN edge-layer cache device, the CDN center-layer cache device directly sends the fragment file of the live content in the memory to the CDN edge-layer cache device without accessing the magnetic disk, thereby avoiding being limited by the number of reading and writing operations per second on the magnetic disk, and providing more concurrent requests.

It should be noted that after the CDN center-layer cache device stores the fragment file of the live content into the memory of the CDN center-layer cache device, the method may further include: obtaining, by the CDN center-layer cache device, a new fragment file of the live content, and using the new fragment file to update the fragment file of the live content stored in the memory. Because the fragment file of the live content stored in the memory is updated, usage of the memory of the CDN center-layer cache device is improved while quality of service of the live content is ensured.

In addition, it should be noted that in the embodiment of the present invention the schematic diagram shows only one layer of center-layer cache device; however, in an actual application, multiple layers of CDN center-layer cache devices may exist, where the specific number of layers is decided by a specific application scenario and is not limited herein, and the number of layers herein is exemplary only.

It should be further noted that for the CDN architecture having a center-layer cache device, when media content is injected in the content origin server, the content origin server sends information about the live content injected in the media content to the CDN management device; the CDN management device may send a pre-delivery request with respect to the live content to both the CDN center-layer cache device and the CDN edge-layer cache device, so that the CDN center-layer cache device and the CDN edge-layer cache device provide services respectively for a terminal device.

It should be further noted that both the CDN center-layer cache device and the CDN edge-layer cache device can store the fragment file of the live content into the memory to support more concurrent requests. In addition, a new fragment file of the live content may be obtained, and the new fragment file is used to update the fragment file of the live content stored in the memory, so as to improve usage of the memory.

The following describes the technical solution of a device embodiment of the present invention.

Figure 8:
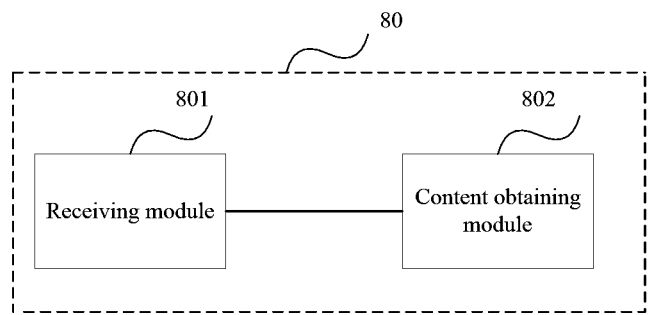
FIG. 8 is a schematic structural diagram of an embodiment of a CDN cache device according to an embodiment of the present invention.

FIG. 8 is a schematic structural diagram of an embodiment of a CDN cache device according to an embodiment of the present invention. As shown in FIG. 8, a CDN cache device 80 includes a receiving module 801 and a content obtaining module 802.

The receiving module 801 is configured to receive a pre-delivery request sent by a CDN management device with respect to live content, where the pre-delivery request is sent to the CDN cache device 80 by the CDN management device before the live content is requested to be played.

The content obtaining module 802 is connected to the receiving module 801 and configured to obtain a fragment file of the live content according to the pre-delivery request.

In the embodiment of the present invention, the content obtaining module 802 is further configured to store the fragment file of the live content into a memory of the CDN cache device 80, thereby avoiding frequent reading and writing operations on a magnetic disk, so that the service life of the magnetic disk is not shortened; meanwhile, when the CDN cache device 80 receives a live content service request sent by a terminal device, the CDN cache device 80 directly provides the fragment file of the live content in the memory for the terminal device without accessing the magnetic disk, thereby avoiding being limited by the number of reading and writing operations per second on the magnetic disk, and providing more concurrent requests.

In the embodiment of the present invention, the content obtaining module 802 is further configured to obtain a new fragment file of the live content, and use the new fragment file to update the fragment file of the live content stored in the memory. Because the fragment file of the live content stored in the memory is updated, usage of the memory of the CDN cache device 80 is improved while quality of service of the live content is ensured.

In the embodiment of the present invention, a CDN cache device 80 caches live content according to a pre-delivery request sent by a CDN management device with respect to the live content before a user views the live content, thereby solving the problems of a long delay and poor user experience in playing live content that is not cached because a part of live content cannot be cached in the prior art, ensuring the play quality of all live content, and improving user experience.

Figure 9:
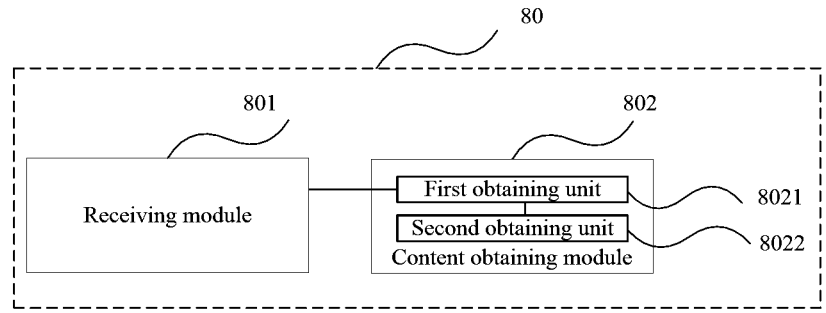
FIG. 9 is a schematic structural diagram of another embodiment of a CDN cache device according to an embodiment of the present invention.

FIG. 9 is a schematic structural diagram of another embodiment of a CDN cache device 80 according to an embodiment of the present invention. As shown in FIG. 9, the content obtaining module 802 of the CDN cache device 80 may include a first obtaining unit 8021 or a second obtaining unit 8022; the first obtaining unit 8021 is connected to the receiving module 801, and the second obtaining unit 8022 is connected to the first obtaining unit 8021.

The first obtaining unit 8021 is configured to obtain an index file of the fragment file of the live content according to an index file address of the fragment file of the live content carried in the pre-delivery request.

The second obtaining unit 8022 is configured to obtain the fragment file of the live content according to the index file.

In the embodiment of the present invention, a CDN cache device 80 receives a pre-delivery request with respect to live content, and obtains an index file of a fragment file of the live content according to an index file address of the fragment file carried in the pre-delivery request, and further obtains the fragment file of the live content and caches the live content before a user requests to play the live content, thereby solving the problems of a long delay and poor user experience in playing live content that is not cached because a part of live content cannot be cached in the prior art, ensuring the play quality of all live content, and improving user experience.

Figure 10:
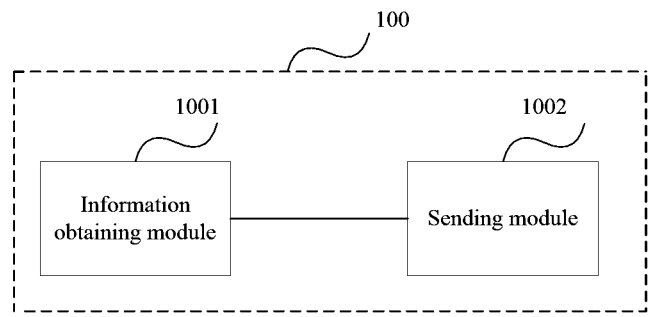
FIG. 10 is a schematic structural diagram of an embodiment of a CDN management device according to an embodiment of the present invention.

FIG. 10 is a schematic structural diagram of an embodiment of a CDN management device 100 according to an embodiment of the present invention. As shown in FIG. 10, the CDN management device 100 includes an information obtaining module 1001 and a sending module 1002.

The information obtaining module 1001 is configured to obtain information about live content injected in a content origin server. The sending module 1002 is connected to the information obtaining module 1001 and configured to send a pre-delivery request with respect to the live content to a CDN cache device, so that the CDN cache device obtains a fragment file of the live content according to the pre-delivery request before the live content is requested to be played.

In the embodiment of the present invention, a CDN management device 100 obtains information about live content injected in a content origin server, and sends a pre-delivery request with respect to the live content to a CDN cache device, so that the CDN cache device caches the live content according to the pre-delivery request before a user requests to play the live content, thereby solving the problems of a long delay and poor user experience in playing live content that is not cached because a part of live content cannot be cached in the prior art, ensuring the play quality of all live content, and improving user experience.

Figure 11:
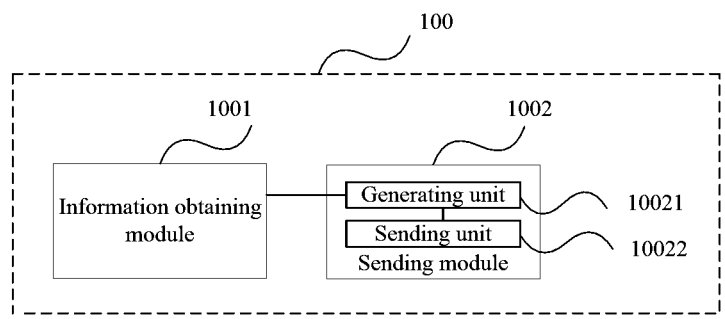
FIG. 11 is a schematic structural diagram of another embodiment of a CDN management device according to an embodiment of the present invention.

FIG. 11 is a schematic structural diagram of another embodiment of a CDN management device 100 according to an embodiment of the present invention. As shown in FIG. 11, the sending module 1002 of the CDN management device 100 may include: a generating unit 10021 or a sending unit 10022.

The generating unit 10021 is connected to the information obtaining module 1001 and configured to generate a pre-delivery request with respect to the live content. The sending unit 10022 is connected to the generating unit 10021 and configured to send the pre-delivery request with respect to the live content to the CDN cache device, so that the CDN cache device obtains the fragment file of the live content according to the pre-delivery request before the live content is requested to be played, stores the fragment file of the live content into a memory of the CDN cache device, obtains a new fragment file of the live content, and uses the new fragment file to update the fragment file of the live content stored in the memory.

Because the fragment file of the live content is stored into the memory of the CDN cache device, frequent reading and writing operations on a magnetic disk are not required, so that the service life of the magnetic disk is not shortened; meanwhile, the limitation by the number of reading and writing operations on the magnetic disk per second may be avoided, and more concurrent requests may be provided. In addition, by using the new fragment file to update the fragment file of the live content stored in the memory, usage of the memory of the CDN cache device can be improved.

The following describes the technical solution of a system embodiment of the present invention.

Figure 12:
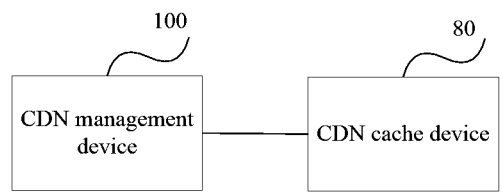
FIG. 12 is a schematic structural diagram of an embodiment of a system for delivering live content according to an embodiment of the present invention.

FIG. 12 is a schematic structural diagram of an embodiment of a system for delivering live content according to an embodiment of the present invention. As shown in FIG. 12, the system includes: a CDN management device 100 and a CDN cache device 80.

The CDN management device 100 is configured to obtain information about live content injected in a content origin server, and send a pre-delivery request with respect to the live content to the CDN cache device 80.

The CDN cache device 80 is connected to the CDN management device 100 and configured to receive the pre-delivery request sent by the CDN management device 100 with respect to the live content, and obtain a fragment file of the live content according to the pre-delivery request, where the pre-delivery request is sent to the CDN cache device 80 by the CDN management device 100 before the live content is requested to be played.

In the embodiment of the present invention, the CDN cache device 80 is further configured to store the obtained fragment file of the live content into a memory of the CDN cache device 80, thereby avoiding frequent reading and writing operations on a magnetic disk, so that the service life of the magnetic disk is not shortened; meanwhile, when the CDN cache device 80 receives a live content service request sent by a terminal device, the CDN cache device 80 directly provides the fragment file of the live content in the memory for the terminal device without accessing the magnetic disk, thereby avoiding being limited by the number of reading and writing operations per second on the magnetic disk, and providing more concurrent requests.

In the embodiment of the present invention, the CDN cache device 80 is further configured to obtain a new fragment file of the live content, and use the new fragment file to update the fragment file of the live content stored in the memory. Because the fragment file of the live content stored in the memory is updated, usage of the memory of the CDN cache device 80 is improved while quality of service of the live content is ensured.

In the embodiment of the present invention, a CDN management device 100 obtains information about live content injected in a content origin server, and sends a pre-delivery request with respect to the live content to a CDN cache device 80, so that the CDN cache device 80 caches the live content according to the pre-delivery request sent by the CDN management device 100 with respect to the live content before a user views the live content, thereby solving the problems of a long delay and poor user experience in playing live content that is not cached because a part of live content cannot be cached in the prior art, ensuring the play quality of all live content, and improving user experience.

Figure 13:
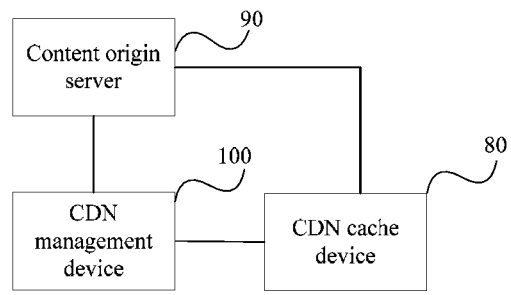
FIG. 13 is a schematic structural diagram of another embodiment of a system for delivering live content according to an embodiment of the present invention.

FIG. 13 is a schematic structural diagram of another embodiment of a system for delivering live content according to an embodiment of the present invention. As shown in FIG. 13, on the basis of FIG. 12, the system further includes a content origin server 90, where the content origin server 90 is connected to the CDN cache device 80 and the CDN management device 100 respectively; the content origin server 90 is configured to receive injected media content, where the media content may include live content and on-demand content.

In the embodiment of the present invention, when live content is injected in a content origin server 90, the content origin server 90 sends information about the live content to a CDN management device 100; the CDN management device 100 sends a pre-delivery request with respect to the live content to a CDN cache device 80, so that the CDN cache device 80 caches the live content before a user requests to play the live content, thereby solving the problems of a long delay and poor user experience in playing live content that is not cached because a part of live content cannot be cached in the prior art, ensuring the play quality of all live content, and improving user experience.

A person of ordinary skill in the art may appreciate that, in combination with the examples described in the embodiments disclosed in this specification, modules, units and steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, device, module and unit, reference may be made to the corresponding process in the method embodiments, and the details will not be described herein again.

In the embodiments provided in the present application, it should be understood that the disclosed system, device, and method may be implemented in other modes. For example, the described device embodiment is merely exemplary. For example, the module division or the unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The modules or units described as separate parts may or may not be physically separate, and parts displayed as modules or units may or may not be physical modules or units, may be located in one position, or may be distributed on a plurality of network modules or units. A part or all of the modules or units herein may be selected according to the actual needs to achieve the objectives of the solutions of the embodiments of the present invention.

In addition, functional modules or units in the embodiments of the present invention may be integrated into one processing module or unit, or each of the modules or units may exist alone physically, or two or more modules or units are integrated into one module or unit. The integrated module or unit may be implemented in a form of hardware, or may be implemented in a form of a software functional unit.

When the integrated module or unit is implemented in the form of a software functional module or unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any equivalent modification or replacement figured out by a person skilled in the art within the technical scope of the present invention shall fall within the protection scope of the present invention. Therefore, the protection scope of the present invention shall be subject to the protection scope of the claims.

What is claimed is:

1. A method for a content delivery network (CDN) cache device delivering a live content stream from a content origin server to a terminal device, the method comprising:
   receiving, by the CDN cache device, a pre-delivery request sent by a CDN management device with respect to the live content stream;
   obtaining, by the CDN cache device from the content origin server, a fragment file of the live content stream according to the pre-delivery request;
   storing, by the CDN cache device, the fragment file of the live content stream into a memory of the CDN cache device;
   further obtaining, by the CDN cache device after the obtaining, a new fragment file of the live content stream; and
   updating, in response to the further obtaining, the live content stream in the memory of the CDN cache device by replacing the fragment file of the live content stream with the new fragment file of the live content stream, such that only a single fragment file is always maintained of the live content stream,
   wherein the receiving the pre-delivery request by the CDN cache device from the CDN management device occurs without the CDN cache device receiving a request from any requesting terminal device for providing the live content stream to the requesting terminal device, wherein the obtaining is performed based upon the CDN cache device receiving the pre-delivery request sent by the CDN management device, and wherein the CDN cache device is a CDN edge-layer cache device, the method further comprising:
receiving, by the CDN edge-layer cache device, a live content service request sent by the terminal device; and
sending, by the CDN edge-layer cache device, the fragment file of the live content stream to the terminal device for playing.

2. The method according to claim 1, wherein the obtaining, by the CDN cache device, the fragment file of the live content stream according to the pre-delivery request comprises:
obtaining, by the CDN cache device, an index file of the fragment file of the live content stream according to an index file address of the fragment file of the live content stream carried in the pre-delivery request, so that the CDN cache device obtains the fragment file of the live content stream according to the index file.

3. The method according to claim 1, further comprising:
receiving, by a CDN center-layer cache device, the live content service request sent by the CDN edge-layer cache device; and
sending, by the CDN center-layer cache device, the fragment file of the live content stream to the CDN edge-layer cache device.

4. A method for delivering a live content stream from a content origin server to a terminal device via a content delivery network (CDN) cache device, the method comprising:
obtaining, by a CDN management device, information about the live content stream injected by the content origin server;
sending, by the CDN management device to the CDN cache device, a pre-delivery request with respect to the live content stream, so that the CDN cache device, in response to the pre-delivery request, performs the further operations of:
  obtaining, by the CDN cache device from the content origin server, a fragment file of the live content stream according to the pre-delivery request;
  storing, by the CDN cache device, the fragment file of the live content stream into a memory of the CDN cache device;
  further obtaining, by the CDN cache device after the obtaining, a new fragment file of the live content stream; and
  updating, in response to the further obtaining, the live content stream in the memory of the CDN cache device by replacing the fragment file of the live content stream with the new fragment file of the live content stream, such that only a single fragment file is always maintained of the live content stream,
wherein the sending the pre-delivery request to the CDN cache device by the CDN management device occurs without the CDN cache device receiving a request from any requesting terminal device for providing the live content stream to the requesting terminal device, and
wherein the CDN cache device is a CDN edge-layer cache device, the method further comprising:
receiving, by the CDN edge-layer cache device, a live content service request sent by the terminal device; and
sending, by the CDN edge-layer cache device, the fragment file of the live content stream to the terminal device for playing.

5. A content delivery network (CDN) cache device, comprising:
a computing hardware, and
a non-transitory computer-readable medium including computer-executable instructions that are executable by the computing hardware to facilitate performing a method for delivering a live content stream from a content origin server to a terminal device, the method comprising:
receiving a pre-delivery request sent by a CDN management device with respect to the live content stream;
obtaining, from the content origin server, a fragment file of the live content stream according to the pre-delivery request;
storing, by the CDN cache device, the fragment file of the live content stream into a memory of the CDN cache device;
further obtaining, by the CDN cache device after the obtaining, a new fragment file of the live content stream; and
updating, in response to the further obtaining, the live content stream in the memory of the CDN cache device by replacing the fragment file of the live content stream with the new fragment file of the live content stream, such that only a single fragment file is always maintained of the live content stream,
wherein the receiving the pre-delivery request by the CDN cache device from the CDN management device occurs without the CDN cache device receiving a request from any requesting terminal device for providing the live content stream to the requesting terminal device,
wherein the obtaining is performed based upon the CDN cache device receiving the pre-delivery request sent by the CDN management device, and
wherein the CDN cache device is a CDN edge-layer cache device, the method further comprising:
receiving, by the CDN edge-layer cache device, a live content service request sent by the terminal device; and
sending, by the CDN edge-layer cache device, the fragment file of the live content stream to the terminal device for playing.

6. The CDN cache device according to claim 5, wherein the obtaining comprises:
first obtaining an index file of the fragment file of the live content stream according to an index file address of the fragment file of the live content stream carried in the pre-delivery request; and
second obtaining the fragment file of the live content stream according to the index file.

7. A content delivery network (CDN) management device, comprising:
a computing hardware, and
a non-transitory computer-readable medium including computer-executable instructions that are executable by the computing hardware to facilitate performing a method comprising:
obtaining information about a live content stream injected in a content origin server;
generating a pre-delivery request with respect to the live content stream; and sending the pre-delivery request with respect to the live content stream to a CDN cache device, so that the CDN cache device, in response to receiving the pre-delivery request, performs delivering the live content stream from the content origin server to a terminal device, the delivering the live content stream comprising:
 obtaining, by the CDN cache device from the content origin server, a fragment file of the live content stream according to the pre-delivery request;
 storing, by the CDN cache device, the fragment file of the live content stream into a memory of the CDN cache device;
 further obtaining, by the CDN cache device after the obtaining, a new fragment file of the live content stream; and
 updating, in response to the further obtaining, the live content stream in the memory of the CDN cache device by replacing the fragment file of the live content stream with the new fragment file of the live content stream, such that only a single fragment file is always maintained of the live content stream,
wherein the sending the pre-delivery request to the CDN cache device by the CDN management device occurs without the CDN cache device receiving a request from any requesting terminal device for providing the live content stream to the requesting terminal device, and
wherein the CDN cache device is a CDN edge-layer cache device, the method further comprising:
 receiving, by the CDN edge-layer cache device, a live content service request sent by the terminal device; and
 sending, by the CDN edge-layer cache device, the fragment file of the live content stream to the terminal device for playing.

8. A system for delivering a live content stream, comprising:
 a content delivery network (CDN) management device and a CDN cache device configured to deliver the live content stream from a content origin server to a terminal device, wherein:
 the CDN management device is configured to perform the operations of:
  obtaining information about the live content stream injected in the content origin server,
  generating a pre-delivery request with respect to the live content stream, and
  sending the pre-delivery request with respect to the live content stream to the CDN cache device; and
 the CDN cache device is configured to perform a method comprising the operations of:
  receiving the pre-delivery request sent by the CDN management device with respect to the live content stream,
  obtaining, from the content origin server, a fragment file of the live content stream according to the pre-delivery request,
  storing, by the CDN cache device, the fragment file of the live content stream into a memory of the CDN cache device;
  further obtaining, by the CDN cache device after the obtaining, a new fragment file of the live content stream; and
  updating, in response to the further obtaining, the live content stream in the memory of the CDN cache device by replacing the fragment file of the live content stream with the new fragment file of the live content stream, such that only a single fragment file is always maintained of the live content stream,
 wherein the receiving the pre-delivery request by the CDN cache device from the CDN management device occurs without the CDN cache device receiving a request from any requesting terminal device for providing the live content stream to the requesting terminal device,
 wherein the obtaining is performed based upon the CDN cache device receiving the pre-delivery request sent by the CDN management device, and
 wherein the CDN cache device is a CDN edge-layer cache device, the method further comprising:
  receiving, by the CDN edge-layer cache device, a live content service request sent by the terminal device; and
  sending, by the CDN edge-layer cache device, the fragment file of the live content stream to the terminal device for playing.

9. The system according to claim 8, further comprising the content origin server, wherein the content origin server is configured to receive injected media content.

10. A non-transitory computer readable medium storing computer executable instructions that, when executed in a content delivery network (CDN) cache device, facilitates the CDN cache device performing a method for delivering a live content stream from a content origin server to a terminal device, the method comprising:
 receiving, by the CDN cache device, a pre-delivery request sent by a CDN management device with respect to the live content stream;
 obtaining, by the CDN cache device from the content origin server, a fragment file of the live content stream according to the pre-delivery request,
 storing, by the CDN cache device, the fragment file of the live content stream into a memory of the CDN cache device;
 further obtaining, by the CDN cache device after the obtaining, a new fragment file of the live content stream; and
 updating, in response to the further obtaining, the live content stream in the memory of the CDN cache device by replacing the fragment file of the live content stream with the new fragment file of the live content stream, such that only a single fragment file is always maintained of the live content stream,
wherein the receiving the pre-delivery request by the CDN cache device from the CDN management device occurs without the CDN cache device receiving a request from any requesting terminal device for providing the live content stream to the requesting terminal device, and
wherein the obtaining is performed based upon the CDN cache device receiving the pre-delivery request sent by the CDN management device, and
wherein the CDN cache device is a CDN edge-layer cache device, the method further comprising:
 receiving, by the CDN edge-layer cache device, a live content service request sent by the terminal device; and
 sending, by the CDN edge-layer cache device, the fragment file of the live content stream to the terminal device for playing.

* * * * *